United States Patent [19]

Raahauge

[11] Patent Number: 4,529,579
[45] Date of Patent: Jul. 16, 1985

[54] METHOD FOR PRODUCING ANHYDROUS ALUMINA

[75] Inventor: Benny E. Raahauge, Copenhagen, Denmark

[73] Assignee: F. L. Smidth & Co., Cresskill, N.J.

[21] Appl. No.: 625,776

[22] Filed: Jun. 28, 1984

Related U.S. Application Data

[63] Continuation-in-part of Ser. No. 393,707, Jun. 30, 1982, abandoned, which is a continuation of Ser. No. 031,926, Apr. 20, 1979, abandoned.

[30] Foreign Application Priority Data

Apr. 20, 1978 [GB] United Kingdom ............... 7815689

[51] Int. Cl.$^3$ ............................................. C01F 7/02
[52] U.S. Cl. ................................................ 423/625
[58] Field of Search ........................................ 423/625

[56] References Cited

U.S. PATENT DOCUMENTS

| | | | |
|---|---|---|---|
| 3,057,680 | 10/1962 | Schytil et al. | 423/489 |
| 3,265,465 | 8/1966 | Turpin | 423/625 |
| 3,336,109 | 8/1967 | Du Bellay et al. | 423/625 |
| 3,452,968 | 7/1969 | Shimizu et al. | 432/4 |
| 3,955,995 | 5/1976 | Towborg . | |
| 4,025,295 | 5/1977 | Towborg . | |
| 4,127,406 | 11/1978 | Kreft et al. | 423/625 |
| 4,352,660 | 12/1982 | Steiner et al. | 432/14 |

FOREIGN PATENT DOCUMENTS 1146041 10/1963 Fed. Rep. of Germany .
50-121198 4/1975 Japan .
745552 2/1950 United Kingdom .

OTHER PUBLICATIONS

Engineering And Mining Journal, Editor (Apr., 1974), p. 23.

Primary Examiner—H. T. Carter
Attorney, Agent, or Firm—Pennie & Edmonds

[57] ABSTRACT

This invention relates to a method for the production of anhydrous alumina having a desired α-conversion from alumina trihydrate.

This method is directed to production of anhydrous alumina having a desired α-conversion from alumina trihydrate in which water is removed in a precalcining zone wherein the alumina trihydrate is heated to a temperature below 450° C. Then, the precalcined dehydrated alumina is recrystallized to α-alumina in a reaction chamber by directing an oxygen containing gas to the reaction chamber, mixing and suspending the precalcined alumina and fuel in the oxygen containing gas and feeding the mixture to a combustion zone, followed by exothermal recrystallization of the alumina which is initiated by rapidly heating the precalcined alumina by burning the fuel in the oxygen containing gas in the hot combustion zone and withdrawing the recrystallized alumina from the top of the reaction chamber suspended in a combustion gas stream. The recrystallized alumina is then separated from the gas stream and cooled to produce anhydrous alumina having the desired content of α-conversion.

19 Claims, 4 Drawing Figures

METHOD FOR PRODUCING ANHYDROUS ALUMINA

DESCRIPTION

This is a continuation-in-part of application Ser. No. 393,707, filed June 30, 1982, which is a continuation of application Ser. No. 031,926, filed April 20, 1979, both now abandoned.

TECHNICAL FIELD

The present invention relates to the production of α-alumina from alumina trihydrate.

Background Art

The manufacture of alumina, containing from 0 to 80 percent by weight $\alpha$-$Al_2O_3$, from wet alumina trihydrate, $Al_2O_3.3H_2O$, is a well known process in which alumina trihydrate exhibits both endothermal and exothermal behavior during processing.

In the production of α-alumina, three distinct processes take place, the first two processes are endothermal while the last is exothermal:

(1) evaporation of free moisture from wet alumina trihydrate filter cake at about 100°–110° C.;

(2) removal of the main part of chemically bound water through calcination at about 250°–1000° C. and simultaneous solid state recrystallization into various intermediate aluminum hydroxide and aluminum oxide compounds; and (3) exothermal formation of $\alpha$-$Al_2O_3$, commencing very slowly at about 1000° C.

While processes (1) and (2) require the addition of heat to maintain the reaction, the third process does not require heat addition when initiated at about 1000° C., except for that needed to compensate for external losses. The rate of formation of $\alpha$-$Al_2O_3$ increases rapidly with increasing temperatures, and the time needed for obtaining a desired quantity of $\alpha$-$Al_2O_3$ decreases as the temperature is increased above 1000° C.

Methods are known in which alumina trihydrate is subjected to heat treatment in separate process units.

U.S. Pat. No. 3,336,109 describes the calcining of aluminum hydroxide and formation of $\alpha$-$Al_2O_3$ in two separate process units operating at different temperatures. Calcining is conducted in a riser pipe to one cyclone in a conventional cyclone preheater by direct combustion of fuel from a burner placed in the bottom of the riser pipe. Formation of $\alpha$-$Al_2O_3$ then occurs in a stationary adiabatic vessel where alumina trihydrate flows by gravity, or alternatively, in a rotary kiln equipped with a burner from which hot smoke gases travel countercurrently to material discharged from the cyclone preheater into the kiln.

U.S. Pat. No. 3,265,465 describes a process using a fluid-bed reactor. Material from a cyclone preheater is injected into the bed through a flame burning tangentially at the top of the fluid-bed reactor. By this method of heat treatment, the temperature of the material reaches a level which initiates formation of $\alpha$-$Al_2O_3$.

In U.S. Pat. No. 3,452,968, a method is described which combines a conventional cyclone preheater with a swirl chamber to initiate the formation of $\alpha$-$Al_2O_3$ before discharging the 1200°–1400° C. hot material to a rotary kiln or fluid-bed. The characteristic feature of the swirl chamber is that the burner and feed pipe for the material are placed vertically at the top of the chamber, whereas secondary air is introduced tangentially in the bottom of the conic section, thus inducing the swirl.

A commercial process in operation today utilizes the principles of a fast or expanded fluidized-bed as disclosed in German Pat. Nos. 1,092,889 and 1,146,041. In these commercial processes, dry precalcined alumina is fed to a fluid-bed kiln in which the main part of the solid circulates through an externally controlled recirculation arrangement.

The oldest commercial stationary process, that is, a process not using a rotary kiln, for making alumina is the fluid flash calcination process described in Engineering and Mining Journal, page 23 (April, 1974). In this stationary process, formation of $\alpha$-$Al_2O_3$ is initiated in a combustion reactor. Fuel and air are burned at the bottom of a furnace where burners are mounted on the outer circumference of a combustion chamber. Precalcined alumina is fed into the combustion chamber above the combustion zone and is carried out with hot smoke gases through the top of the furnace. Hot material is separated from the smoke gases at the top of a fluid-bed vessel, which acts as a cyclone separator, and discharged to the bottom where the fluid-bed is established.

The mentioned references and commercial processes relate to drying and precalcining processes in cyclone preheaters and formation of $\alpha$-$Al_2O_3$ in either a fluid-bed, a rotary kiln, or an adiabatic vessel. One common feature of these units is that the residence time of alumina trihydrate feed falls within a range of several minutes to more than 2 hours at temperatures ranging from 1100° to 1200° C.

Compared with stationary plants, commercial processes using rotary kilns have a serious disadvantage of requiring a substantially greater specific heat consumption. On the other hand, stationary plants utilizing fluid-bed principles (including the expanded type) are complicated to operate and have relatively high maintenance costs as a result. Plants using fluidized beds are also complicated to operate because less air than necessary for complete combustion of the fuel is needed in order to fluidize the bed. This results in complicated air flows which require careful control. In addition, fluidized bed operation requires a fragile gas distribution device in order to establish proper fluidization of the bed which again necessitates special precautions to insure continuous operation.

Japanese Pat. No. 121,198/75 describes a method of calcining sandy aluminum hydroxide in which the aluminum hydroxide is converted into anhydrous alumina in a cyclone preheater. Then, precalcined alumina is converted to α-alumina in a temperature range of 1150°–1450° C. in a gas flow calciner. This patent emphasizes that the aluminum hydroxide must be preheated from 600°–1100° C. in less than 30 seconds to obtain a reasonable rate of α conversion.

The method disclosed in this Japanese patent suffers from several drawbacks. The high temperature requirements of the material entering the final heat treatment raises the temperature of the gases leaving the cyclone preheater and results in poor heat economy.

Therefore, the prior art methods all have some type of limitation which prevents their general acceptance for commercial application. Thus, a method for producing anhydrous alumina is sought which avoids the detriments of the prior art while also providing the following desirable requirements:

(1) the formation of a uniform (i.e., chemically homogenous) product;
(2) the ability to easily obtain any degree of α-conversion in the final alumina product; and
(3) minimizing the production of fines due to decrepitation of the particles.

I have invented a process which provides these features while overcoming the disadvantages of the prior art. Up to now, it has been thought that the production of anhydrous alumina necessitated a method comprising treatment in a tempering zone (e.g. in a rotary kiln or a fluid bed) which requires a considerable retention time as well as larger apparatus and higher energy requirements. In contrast, I have found that it is possible by rapidly heating precalcined alumina to very high temperatures in a combustion zone of a reaction chamber while avoiding the above-mentioned disadvantages to obtain a drastic reduction of recrystallization time from several minutes to a few seconds.

DISCLOSURE OF INVENTION

Broadly, the method of the present invention is directed to the production of anhydrous alumina having a desired degree of α-conversion, i.e. a desired degree of conversion to α-alumina phase, from alumina trihydrate in which water is removed in a precalcining zone wherein the alumina trihydrate is suspended in, heated by, and separated from a stream of hot gases. The method includes recrystallizing the precalcined dehydrated alumina to α-alumina in a reaction chamber. Fuel and oxygen containing gas are fed to a combustion zone in this reaction chamber. Precalcined alumina and fuel are mixed and suspended in the oxygen containing gas, which is then fed to the combustion zone. Exothermic recrystallization is initiated by burning these combustion gases to rapidly heat the precalcined alumina which is suspended in these gases to the desired temperature to achieve the desired α-conversion. Then, recrystallized alumina exits the reaction chamber suspended in the combustion gas stream. This recrystallized alumina is separated from the gas stream and cooled to produce anhydrous alumina having the desired α-content.

In one embodiment of the invention, there is disclosed a method for producing substantially uniform anhydrous alumina having a controlled degree of α-conversion from alumina trihydrate comprising heating the alumina trihydrate to a temperature range between about 150° C. up to but not exceeding about 450° C. in a precalcining zone to remove any free or combined water, recrystallizing the precalcined material to α-alumina in a combustion gas stream in a reaction chamber, separating the recrystallized alumina from the combustion gas stream, and cooling the recrystallized alumina to produce substantially uniform anhydrous alumina particles having a controlled degree of α-conversion.

The precalcined alumina is recrystallized by feeding the precalcined alumina and fuel to the reaction chamber, introducing the precalcined alumina and fuel into the bottom of the reaction chamber at intersecting directions to cause intimate mixing thereof, introducing an oxygen containing gas upwards through the bottom of the reaction chamber to suspend the mixture of precalcined alumina and fuel, subjecting the precalcined alumina to a rapid increase in temperature by burning the fuel in the oxygen containing gas in a combustion zone to initiate exothermal recrystallization of the precalcined alumina, recrystallizing the precalcined alumina in entrained suspension in the reaction chamber, and withdrawing the recrystallized alumina suspended in a combustion gas stream at the top of the reaction chamber.

Preferably, the rapid increase in temperature of the precalcined alumina takes place during a period of less than about 0.2 times the particle retention time in the reaction chamber. Generally, this time interval ranges from about 0.02 to 1 second, although it is advantageous to range between about 0.1 to 0.5 seconds. A typical preferred time of about 0.25 seconds generally provides optimum results. Also, it has been found that a rapid increase of at least 600° C. will initiate the exothermal recrystallization of the precalcined alumina.

It should further be noted that the exothermal recrystallization of the precalcined alumina occurs when the alumina is in entrained suspension and rising in the combustion gas stream where the fuel and oxygen are burned to provide the rapid heating. After the desired amount of recrystallization occurs, the recrystallized alumina suspended in the combustion gas stream is withdrawn from the top of the reaction chamber, separated from the combustion gas stream, and cooled to obtain the final product.

Proper control of the particle size distribution of the final product is achieved by the use of a precalcining temperature range of less than about 450° C. Since water can be removed by exceeding its boiling point, the lower temperature limit for precalcining must be above 100° C. An advantageous lower limit for the precalcining step has been determined to be about 150° C. It is preferable, however, to use a range of between about 200° and 450° C., while the preferred embodiment of the application discloses a range of about 400° to 450° C.

This precalcining temperature range is critical to prevent the decrepitation of particles due to fragility. It is known that alumina and/or aluminum hydroxide particles become more and more fragile as the temperature of the particles increases. At room temperature, the particle's breakdown tendency is very low. As the temperature increases, the breakdown tendency slowly increases until about 400° C. At about this temperature, the particle's fragility begins to increase rapidly. At temperatures above about 450° C., the particles have become so fragile that even minor mechanical influences, such as simple precipition in a cyclone, will cause the production of a large amount of fines.

As the temperature continues to increase, however, the particle's breakdown tendency then slowly decreases. At about 1000° to 1100° C., this critical or fragile range ends because the particles begin to recrystallize.

Therefore, holding the precalcining temperature range below 450° C. and rapidly heating the precalcined alumina to the exothermic recrystallization temperature range minimizes the formation of fines and controls the uniformity of the final product.

In this manner, formation of $\alpha$-$Al_2O_3$ from pulverous dry and precalcined alumina occurs in between about 0.5 and 5 seconds at temperatures ranging from about 1100° to 1600° C. and preferably about 1200° to 1600° C. depending upon the desired amount of $\alpha$-$Al_2O_3$ in the final alumina product.

One suitable manner for carrying out the method of the present invention involves passing an oxygen containing gas upwards through the center of the bottom of a reaction chamber. Precalcined alumina and fuel, such as fuel oil, are introduced at the bottom of that chamber in mutually intersecting directions to provide for the intimate mixing of precalcined alumina and fuel before these meet and become suspended in the oxygen containing gas. This insures intimate contact between the suspended alumina, fuel and oxygen containing gas in the combustion zone of the reaction chamber. The heated alumina and the exhaust gases from the combustion zone exit at the top of the reaction chamber in a combustion gas stream. Then, the recrystallized alumina is separated from the gas stream, and cooled to obtain the final product.

After separating the suspended recrystallized alumina from the combustion gas stream, it is advantageous to recycle this gas for heating the alumina trihydrate in the precalcining zone. Also, precalcining is preferably carried out in a multistage cyclone preheater.

A preferred way of introducing these particles and gases into the reactor involves feeding the precalcined alumina onto a downwardly, inwardly inclined annular bottom wall of a reaction chamber. Fuel is preferably introduced into this chamber at a lower position than the precalcined alumina and preferably upwards through the bottom wall.

Improved heat economy is achieved if fines are separated from the precalcined alumina before it is introduced into the reactor. These fines can be introduced into the combustion gas stream after it exits the reaction chamber. As noted hereinabove, the present invention minimizes the production of fines due to the controlled precalcining and recrystallizing temperature ranges.

The material coming from the uppermost cyclone of the multistage cyclone preheater can be divided into two material streams. One stream can be directed to a riser pipe to a second, lower cyclone, while the other stream and the recrystallized alumina which has been separated from the combustion gas stream can be combined with, suspended in, and cooled in a cooling air stream. This second stream and the recrystallized alumina separated from the combustion gas stream are preferably introduced into a mixing chamber and mixed before they are suspended in the cooling air stream. Then the solids are separated from the cooling air stream and, if desired, subjected to further cooling in additional cooling air streams to obtain the final product. The solid-free hot cooling air may be introduced into the reaction chamber as the oxygen containing gas.

In a preferred embodiment, there is disclosed a method for producing substantially uniform anhydrous alumina having a controlled degree of α-conversion from alumina trihydrate comprising heating the alumina trihydrate to a temperature range of between about 150° C. up to but not exceeding about 450° C. in a precalcining zone to remove any free or combined water, at least partially recrystallizing the precalcined alumina to α-alumina in a reaction chamber in a combustion gas stream, separating the partially recrystallized alumina from the combustion gas stream, and rapidly cooling the recrystallized alumina in a cooling zone to produce substantially uniform anhydrous alumina particles having a controlled degree of α-conversion.

In this embodiment, the precalcined alumina is at least partially recrystallized by feeding the precalcined alumina onto a downwardly and inwardly inclined annular bottom wall of the reaction chamber, introducing the precalcined alumina and fuel at the bottom of the reaction chamber in intersecting directions to cause intimate mixing thereof, introducing an oxygen containing gas upwards through the bottom of the reaction chamber to suspend the mixture of precalcined alumina and fuel, subjecting the precalcined alumina to a rapid increase of temperature of at least 600° C. by burning the fuel in the oxygen containing gas in a hot combustion zone to initiate exothermal recrystallization of the precalcined alumina, converting the precalcined alumina to α-alumina at temperatures from about 1100° to 1600° C. in about 0.5 to 5 seconds in entrained suspension in a combustion gas stream, and withdrawing the recrystallized alumina suspended in the combustion gas stream at the top of the reaction chamber.

The high heat transfer rate and efficiency prevailing in the combustion zone enables rapid and vigorous initiation of the exothermal recrystallization step. Previous processes lasted at least 30 minutes or necessitated a very high temperature for the final conversion treatment while the present process can be terminated in seconds without the need for initially preheating the precalcined alumina to a high temperature. This is most probably due to the intimate contact between fuel, preheated material and oxygen containing gas which is characteristic of the present method. The present combustion principle is described in U.S. Pat. Nos. 3,955,995 and 4,025,295, but only in connection with endothermal processes which can be carried out practically isothermally. The application of this principle for heating of exothermal processes is unknown, especially considering the fact that the precalcined material introduced into the reaction chamber is subjected to a rapid increase in temperature of at least 600° C., namely from between 150° and 450° C., to between 1100° and 1600° C., preferably during a period of less than 0.2 times the particle retention time in the reaction chamber.

Compared to systems using a rotary kiln, the present method also has the advantage of having a much lower specific heat consumption, about 720–760 kcal per kg for alumina calcining compared to about 1000–1100 kcal per kg for a rotary kiln system.

Compared to known stationary systems employing either conventional or expanded fluid-bed techniques, the present invention avoids the need for gas distributors placed in the gas/air flow path as well as any division of gas/air streams due to differences in air/gas requirements for combustion and fluidization, respectively. Here, gas distribution devices are not needed to obtain proper pneumatic conveying of the pulverous material through the high temperature reaction chamber. The entire amount of combustion gas or preheated air needed for combustion is taken through the reaction chamber, and this avoids dividing and separately controlling the gas flows.

Compared with other systems, very high temperatures are rapidly obtained by combustion of fuel in the oxygen containing gas. This combustion eliminates the need for precalcining to a high temperature or providing additional heat to achieve the required reaction temperature. The residence time needed by the heater particles to reach the desired α-conversion temperature is substantially reduced because high temperatures are rapidly attained by this combustion.

Compared to the method disclosed in the Japanese patent, the present invention avoids the disadvantage of operating with temperatures of about 900° C. for the material entering the reaction chamber as disclosed in example 1 of the Japanese patent. The present invention ensures fast conversion with minimum particle breakdown due to the controlled precalcining temperature range and rapid recrystallizing step at low solid concentration and retention time in the reaction chamber.

Further improvements in heat economy may be achieved by dust circulation and partitioning of the solid material from the uppermost cyclone.

By using the dust removal and recycling system, dust and other fine particles from the gas leaving the uppermost cyclone are removed by an electrostatic precipitator. This cold dust may be suspended in the suspension withdrawn at the top of the reaction chamber and thus heated by the hot recrystallized alumina. Later, the particles and dust are separated from the gases in a cyclone. Thus, the temperature load on that cyclone is decreased, because the heat is taken up by the cool fine dust from the electrostatic precipitator when it is mixed with the recrystallized alumina. This reduces the temperature of the material which is discharged into the cyclone cooler. This dust may also be mixed with the separated recrystallized alumina before this is subjected to air cooling.

Partitioning of relatively cold material coming from the uppermost cyclone and mixing part of it with the very hot material separated from the gas stream coming from the reaction chamber yield another improvement in heat economy because of direct heat exchange between the cold and hot particles as opposed to indirect heat transfer by a gaseous heat transfer medium. This arrangement also makes it possible to vary the properties of the final product.

BRIEF DESCRIPTION OF DRAWINGS

Preferred embodiments of the present invention are described, by way of example only, with reference to the accompanying drawings wherein.

DESCRIPTION OF THE PREFERRED EMBODIMENTS

Figure 1:
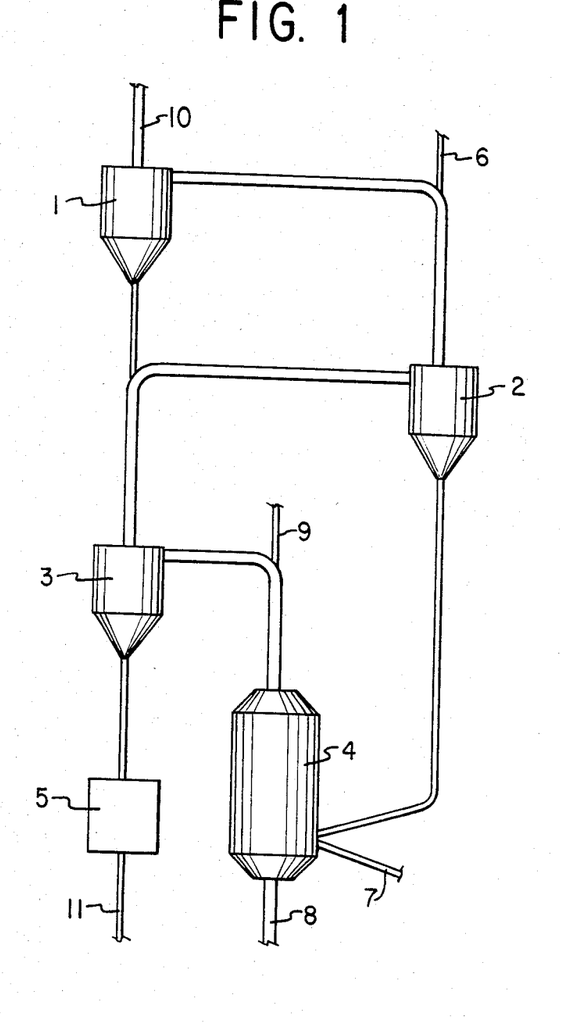
FIG. 1 is a schematic diagram of one embodiment of the present invention.

Referring to FIG. 1, a reaction chamber 4 has a reaction zone for recrystallization. Cyclones 1 and 2 have preheating zones and cyclone 3 has a separator for separating the product from the hot gases exiting from the reaction chamber. A cooler 5 has a cooling zone. Alumina trihydrate is introduced into the preheating zone through an inlet 6 into the riser pipe from cyclone 2. Dust from an electrostatic filter (not shown) may be introduced into the riser pipe from the reaction chamber through an inlet 9. The product separated from the hot gases in cyclone 3 is cooled in cooler 5 and discharged through an outlet 11. The reaction chamber is fed with fuel through a duct 7 and with oxygen containing gas through an inlet 8. The gases leave the preheating zone of cyclone 1 through a pipe 10 and are further deducted in an electrostatic filter (not shown).

Wet alumina trihydrate is introduced through inlet 6, dried and precalcined in the stream of hot gases in the riser pipe from the cyclone 2, separated from these gases in cyclone 1, introduced into the riser pipe from the cyclone 3, precalcined in the gases coming from this cyclone and separated in cyclone 2. During this treatment, the main part of free water and chemically bound water is removed. Then, the precalcined material is introduced into reaction chamber 4 and brought into intimate contact with fuel and oxygen containing gas. Rapid combustion takes place in a combustion zone having a small extent providing a very rapid rise in temperature of the alumina particles, initiating the exothermal recrystallization process in a very short time. Because an exothermal reaction occurs within the particles, they are heated, causing very rapid recrystallation. During this process, alumina particles are suspended in the gaseous mixture of oxygen containing gas and combustion products and are transported from the reaction chamber by this gaseous mixture and separated from it in cyclone 3. The recrystallized product, containing the desired amount of α alumina, is cooled in cooler 5.

Figure 2:
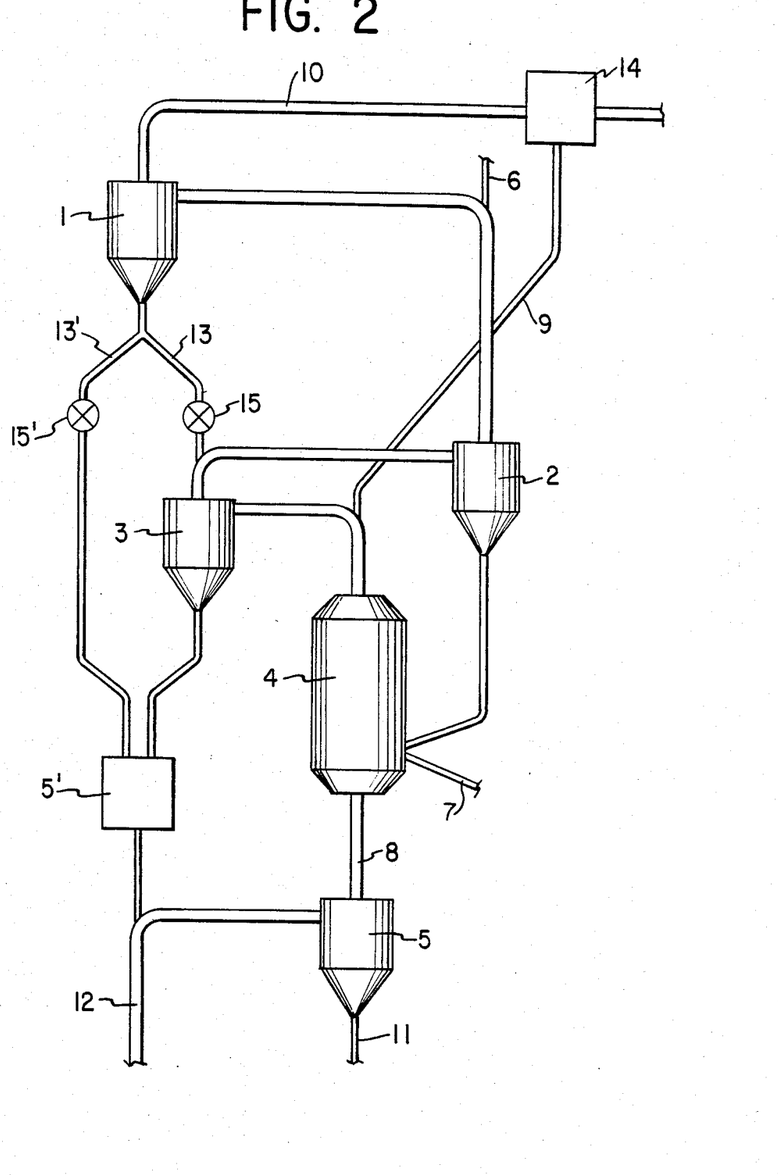
FIG. 2 is a schematic diagram of another embodiment.

FIG. 2 shows a preferred embodiment of the apparatus used to carry out the process of the present invention. In this Figure, numbers 1 to 11 depict the same features shown in FIG. 1. FIG. 2 further shows electrostatic precipitator 14. Material exiting through a pipe from the cyclone 1 is divided into two streams contained in pipes 13 and 13' having valves 15 and 15' respectively. The preheated material coming from cyclone 2 can be divided into two streams of which the first through pipe 13 and valve 15 is fed to the riser pipe from cyclone 3 as explained above. The second stream is fed to a mixing and cooling chamber 5' where it is mixed with the hot product separated from the hot gases leaving reaction chamber 4. The mixed product is fed to a cooling air pipe 12, suspended in the cooling air and separated in cyclone 5, which can be the highest stage in a multi-stage cyclone cooler.

Figure 3:
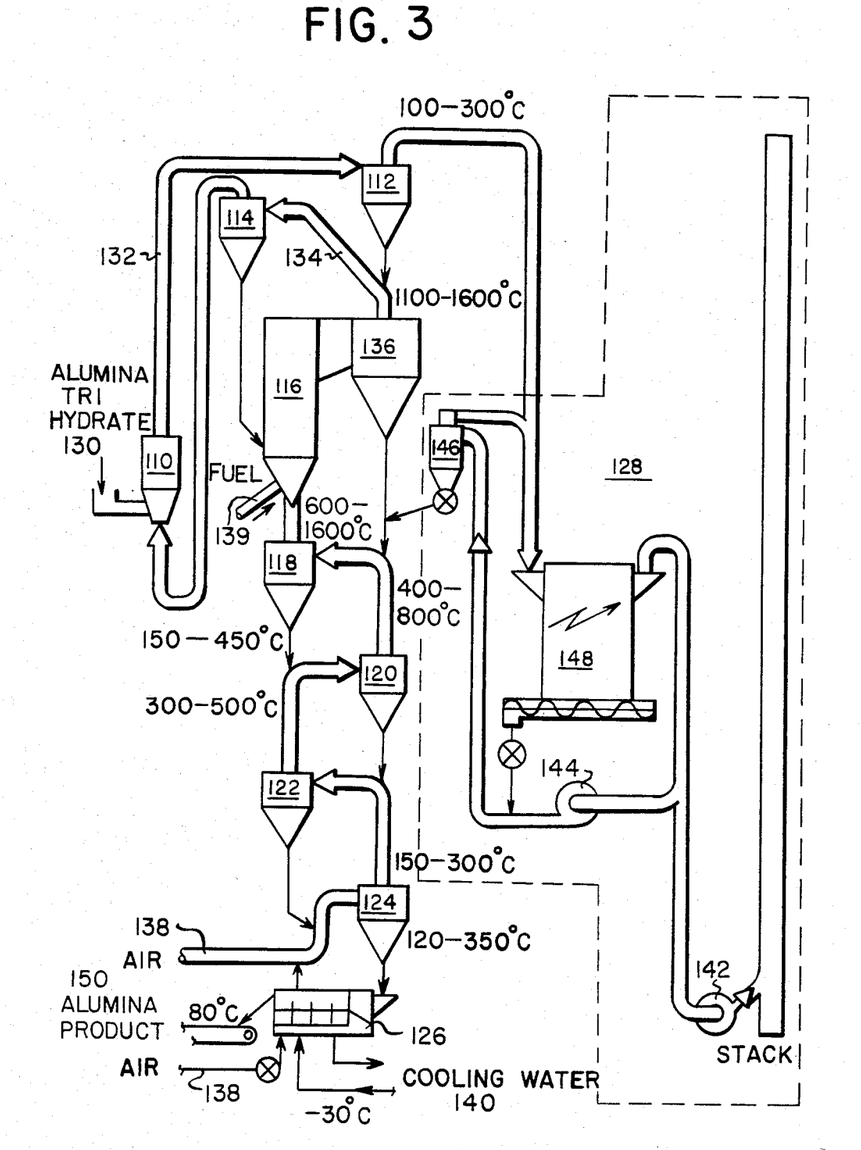
FIG. 3 is a flow sheet illustrating the general process of the present invention and including the preferred temperature ranges of the gases entering and exiting the several components of the apparatus.

Referring now to FIG. 3, there is illustrated a flow sheet for the stationary process of the present invention. The main components of the apparatus used in this process are as follows: a venturi type flash-drier 110, a 2-stage cyclone preheater 112, 114, a gas-suspension calciner 116, a four-stage cyclone cooler 118, 120, 122, 124, a secondary fluid-bed cooler 126, and a dust removal and recycling system, 128, consisting of an electrostatic precipitator, 148, blowers 142, 144, and separator, 146. The operation of this system and process is more fully described hereinbelow.

Wet filter cake (alumina trihydrate) 130 containing 9–12% free moisture enters the flash-drier 110 at a temperature of about 60° C. The material dried in the flash drier is carried to the first or upper preheater cyclone 112 by the gas flow in pipe 132.

The dry aluminum hydroxide from the upper preheater cyclone 112 is preheated and partly calcined in the gas duct 134 to the second preheater cyclone 114. Preheated material is separated from the gas in the second preheater cyclone 114 and discharged into the reactor or calciner 116 at a temperature of 300°–400° C. Fuel 139 is mixed with the precalcined alumina, the mixture of fuel and alumina is suspended in a rising stream of hot air coming from a cooling cyclone 118. The fuel is burned in the rising stream of hot air, and the alumina is recrystallized while entrained in the combustion gas which is rising in the reactor or calciner during a retention time of a few seconds at a temperature of 1100°–1600° C. The calciner temperature is chosen in accordance with the desired α-content of the final product. Recrystallized alumina is separated from the hot gases in the disengaging cyclone 136, mixed with fines from the dust removal and recycling system 128, and then discharged into the 4-stage cyclone cooler, 118, 120, 122, 124.

The alumina is cooled in these four stages. The material retention time per step is less than 45 seconds; heat exchange and temperature retention essentially take place in the riser pipe between the place for material introduction and cyclone; material retention time in the riser pipe is less than 1 second; thus there is extremely rapid cooling of the product in each of these four steps to a temperature of approximately 250° C. by overall countercurrent heat exchange with the air 138 used for combustion of fuel in the calciner. The temperature of the final alumina product, 150, having the desired α-content, is then reduced to 80° C. in the secondary fluid-bed cooler 126, where the alumina product is cooled indirectly by water 140 flowing countercurrently to the alumina.

The specific fuel consumption of the process of the present invention for this embodiment is equivalent to about 3150 MJ per ton alumina (1350 Btu/lb), but can vary because it depends on the moisture content of the wet filter cake feed.

A total pressure drop of only 800-900 mm water gauge is the result of utilizing diluted gas-solid suspension flow throughout the system. Air 138 for cooling the alumina is taken from the atmosphere. The specific air consumption is minimized because of the vertical arrangement of the cyclones eliminating the need for in-plant pneumatic transport of material by cold air from the atmosphere.

Therefore, as a result of low overall pressure drop and low specific air consumption, a low specific power consumption of about 17 kWh per ton alumina is estimated for this process.

Referring now to FIG. 3, there is illustrated the preferred temperature ranges of the gases and particles which exit or enter the apparatus components as shown.

Figure 4:
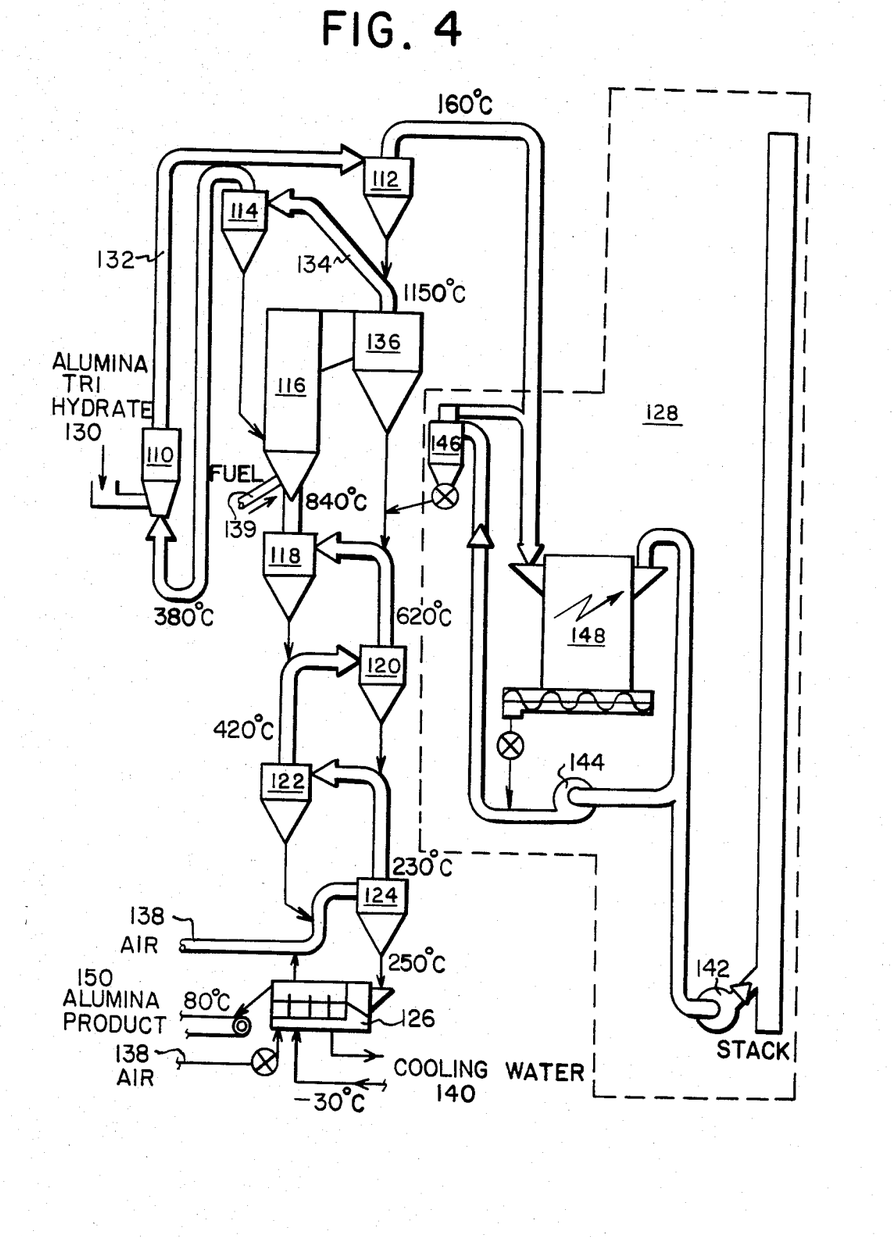
FIG. 4 is a flow sheet as in FIG. 3, but illustrating the best mode, including the preferred temperatures, for carrying out the process of the present invention.

In FIG. 4, there is illustrated the same flow sheet as in FIG. 3 except the best mode and preferred operating temperatures are indicated for convenience of illustration. The numerals of the apparatus components of FIG. 4 correspond identically to the apparatus components of FIG. 3.

The following example illustrates the method and apparatus of the present invention. Although a preferred method is described below, it is merely illustrative and not considered to limit the present invention.

EXAMPLE 1

A calcination installation including a cylindrical reaction chamber having a 600 mm inside diameter and 3800 mm height was heated using light fuel oil (net caloric value: 10150 Kcal/kg) and supplied with air at a rate leading to a velocity of about 3.8 m/sec in the reaction chamber.

Wet $Al_2O_3 \cdot 3H_2O$ (alumina trihydrate filter cake) containing about 12% free moisture was preheated in the exit gases from the reaction chamber in a preheater as shown in FIG. 1. During preheating, free water is evaporated yielding a dry $Al_2O_3 \cdot 3H_2O$ with a loss on ignition about 34.9% by weight. That dried product was further heated in the preheater to yield a feed product to the reaction chamber essentially composed of $Al_2O_3$, and having a loss of ignition about 3-6% by weight and a temperature about 350°-450° l C.

This feed product of precalcined alumina was introduced at the bottom of the reaction chamber and brought into intimate contact with the fuel oil introduced below the feed material. The mixture of alumina and fuel oil is suspended in the combustion air, which is introduced at the center of the bottom of the reaction chamber providing an initiation zone at the bottom of their reactor. The temperature in the reaction chamber is measured at three positions in the reaction chamber and a value is obtained which can be considered an average temperature in the reactor.

By varying the fuel feed rate and air supply, the average temperature in the reaction chamber can be set for hard burning of the alumina, that is to produce large amounts of α-alumina. The burned alumina exiting the reaction chamber as a suspension, was separated from the hot gases and was cooled. After cooling, the α-alumina content and the loss of ignition was measured. Table I shows values of products obtained using the steps outlined above.

TABLE I

| Example | Average Reaction Temperature (°C.) | Content of Alumina (% by weight) | Type of Alumina | Gas Retention Time (seconds) |
|---|---|---|---|---|
| 1 | 1500 | 75 | Floury | 0.89 |
| 2 | 1420 | 56 | Floury | 0.88 |
| 3 | 1400 | 39 | Intermediate | 0.80 |
| 4 | 1335 | 17 | Sandy | 1.02 |
| 5 | 1260 | 9 | Sandy | 0.96 |

These products showed a loss of ignition varying from about 0.1 to about 0.5% by weight and were produced in quantities of about 200 kg per hour.

Using the procedure explained above, the following products were obtained. Tables II and III describe the products:

TABLE II

| Example | Average Reactor Temperature (% C.) | Loss of Ignition (% by Weight) | BET Specific Surface Area (m²/g) | α-Alumina Content In Different Size Fractions | | | | |
|---|---|---|---|---|---|---|---|---|
| | | | | $+74\mu$ | $+63-74\mu$ | $+44-63\mu$ | $-44\mu$ | Total |
| 6 | 1510 | 0.53 | 15.5 | 75.2 | 75.7 | 76.2 | 79.0 | 77.6 |
| 7 | 1435 | 0.61 | 31.4 | 40.5 | 43.7 | 45.6 | 50.5 | 47.4 |
| 8 | 1290 | — | 48.1 | 16.7 | 14.5 | 14.5 | 13.6 | 14.5 |

X-ray diffraction of the final alumina product showed the following distribution of minerals in these products as are tabulated in Table III:

TABLE III

| | Content (Qualitative) | | |
|---|---|---|---|
| Example | Large Content | Medium Content | Small Content |
| 6 | α-$Al_2O_3$ | — | γ-,σ-,θ-$Al_2O_3$ |
| 7 | α-$Al_2O_3$ | γ-,σ-,θ-$Al_2O_3$ | — |
| 8 | γ-,σ-,θ-$Al_2O_3$ | α-$Al_2O_3$ | — |

These results indicate that the present method allows manufacture of alumina with a broad range of properties, corresponding to sandy, intermediate and floury types of alumina. Furthermore, by varying the reactor temperature as shown in Table II, the α- content of the final alumina product can be varied to a desired amount.

The alumina produced according to the present invention is a highly suitable basic material for the electrolytic manufacture of aluminum.

Demands on the alumina can vary from plant to plant but typically have an α-alumina content of 0–20% BET Specific Surface Area 40–80 m²/g and Loss on ignition less than 1%.

It is not intended to limit the present invention to the specific embodiments described above. It is recognized that other changes may be made in the method and apparatus specifically described herein without deviating from the scope and teachings of this invention. It is intended to encompass all other embodiments, alternatives and modifications consistent with the present invention.

I claim:

1. A method for producing substantially uniform anhydrous alumina having a controlled degree of alpha conversion from alumina trihydrate comprising:
   (1) heating said alumina trihydrate to a temperature range between about 150° C. up to but not exceeding about 450° C. in a precalcining zone to remove free and combined water;
   (2) recrystallizing said precalcined alumina to alpha alumina in a reaction chamber by:
      (a) feeding said precalcined alumina and fuel to said reaction chamber;
      (b) introducing said precalcined alumina and said fuel into the bottom of said reaction chamber at intersecting directions to cause intimate mixing thereof;
      (c) introducing an oxygen containing gas upwards through the bottom of said reaction chamber to suspend said mixture of precalcined alumina and fuel;
      (d) subjecting said precalcined alumina to a rapid increase in temperature of at least 600° C. during a period of less than about 0.2 times the particle retention time in said reaction chamber by burning said fuel in said oxygen containing gas in a combustion zone to initiate exothermal recrystallization of said precalcined alumina;
      (e) recrystallizing said precalcined alumina for between about 0.5 and 5 seconds at temperatures ranging from about 1100° to 1600° C. in entrained suspension in said reaction chamber to form the desired content of alpha alumina in the final product; and
      (f) withdrawing said recrystallized alumina suspended in a combustion gas stream at the top of said reaction chamber;
   (3) separating said recrystallized alumina from said combustion gas stream; and
   (4) cooling said recrystallized alumina; thereby producing substantially uniform anhydrous alumina particles having the desired degree of alpha conversion.

2. The method according to claim 1 wherein said precalcined alumina is directed onto a downwardly and inwardly inclined annular bottom wall located in said reaction chamber.

3. The method according to claim 2 wherein said combustion gas stream from said reaction chamber, after separating said suspended recrystallized alumina, is used for heating said aluminum trihydrate in said precalcining zone.

4. The method according to claim 3 wherein fines are separated from said precalcined alumina.

5. The method according to claim 4 wherein said fines are introduced into said combustion gas stream after it exits from said reaction chamber.

6. The method according to claim 3 wherein said precalcining zone is a multi-stage cyclone preheater.

7. The method according to claim 6 wherein said alumina trihydrate is heated to a temperature range of about 200° to 450° C. in said precalcining zone.

8. The method according to claim 7 wherein said separated recrystallized alumina is suspended in a first cooling air stream.

9. The method according to claim 8 wherein solids are separated from the first cooling air stream and subjected to additional cooling air streams.

10. The method according to claim 9 wherein the solid-free first cooling air stream is introduced into said reaction chamber as oxygen containing gas.

11. The method according to claim 10 wherein said precalcined alumina coming from the uppermost cyclone is divided into two streams.

12. The method according to claim 11 wherein one of said precalcined alumina streams leaving said uppermost cyclone and said separated recrystallized alumina are suspended in a first cooling air stream.

13. The method according to claim 12 wherein said precalcined alumina stream from said uppermost cyclone and said separated recrystallized alumina are mixed in a mixing chamber before being suspended in a first cooling air stream.

14. The method according to claim 13 wherein solids are separated from the first cooling air stream and are subjected to additional cooling air streams.

15. The method according to claim 1 wherein the average reaction temperature is maintained between about 1290° and 1510° C. so as to produce an alpha alumina content of between about 14.5 and 77% in the final product.

16. A method for producing substantially uniform anhydrous alumina having a controlled degree of alpha conversion from alumina trihydrate comprising:
   (1) heating said alumina trihydrate to a temperature range between about 150° C. up to but not exceeding about 450° C. in a precalcining zone to remove any free or combined water;
   (2) at least partially recrystallizing said precalcined alumina to alpha alumina in a reaction chamber by:
      (a) feeding said precalcined alumina onto a downwardly and inwardly inclined annular bottom wall of said reaction chamber;
      (b) introducing said precalcined alumina and said fuel at the bottom of said reaction chamber in intersecting directions to cause intimate mixing thereof;
      (c) introducing an oxygen containing gas upwards through the bottom of said reaction chamber to suspend said mixture of precalcined alumina and fuel;
      (d) subjecting said precalcined alumina to a rapid increase in temperature of at least 600° C. during a period of less than 0.2 times the particle retention time in said reaction chamber, by burning said fuel in said oxygen containing gas in a hot combustion zone to initiate exothermal recrystallization of said precalcined alumina;

(e) converting said precalcined alumina to alpha alumina at temperatures from about 1100° to 1600° C. in about 0.5 to 5 seconds in entrained suspension in a combustion gas stream to form the desired content of alpha alumina in the final product; and (f) withdrawing said recrystallized alumina suspended in said combustion gas stream at the top of said reaction chamber;

(3) separating said recrystallized alumina from said combustion gas stream; and (4) rapidly cooling said recrystallized alumina in a cooling zone; thereby producing substantially uniform alumina particles having the desired degree of alpha conversion.

17. The method according to claim 16 wherein the temperature range of the precalcining zone is maintained between about 200° and 450° C.

18. The method according to claim 16 wherein the average reaction temperature is maintained between about 1290° and 1510° C. so as to produce an alpha alumina content of between about 14.5 and 77% in the final product.

19. A method for producing substantially uniform anhydrous alumina having a controlled degree of conversion from alumina trihydrate comprising:

(1) heating said alumina trihydrate to a temperature range between about 150° C. up to but not exceeding about 450° C. in a precalcining zone to remove any free or combined water;

(2) at least partially recrystallizing said precalcined alumina to alpha alumina in a reaction chamber by:

(a) feeding said precalcined alumina onto a downwardly and inwardly inclined annular bottom wall of said reaction chamber;

(b) introducing said precalcined alumina and said fuel at the bottom of said reaction chamber in intersecting directions to cause intimate mixing thereof;

(c) introducing an oxygen containing gas upwards through the bottom of said reaction chamber to suspend said mixture of precalcined alumina and fuel;

(d) subjecting said precalcined alumina to a rapid increase in temperature of at least 600° C. during a period of less than 0.2 times the particle retention time in said reaction chamber, by burning said fuel in said oxygen containing gas in a hot combustion zone to initiate exothermal recrystallization of said precalcined alumina;

(e) converting said precalcined alumina to alpha alumina at temperatures between about 1290° and 1590° C. in about 0.5 to 5 seconds in entrained suspension in a combustion gas stream to form an alpha alumina content of between about 14.5 and 77% in the final product; and (f) withdrawing said recrystallized alumina suspended in said combustion gas stream at the top of said reaction chamber;

(3) separating said recrystallized alumina from said combustion gas stream; and (4) rapidly cooling said recrystallized alumina in a cooling zone; thereby producing substantially uniform alumina particles having the desired degree of alpha conversion.

* * * * *